US012553868B2

(12) United States Patent
Zhang et al.

(10) Patent No.: US 12,553,868 B2
(45) Date of Patent: Feb. 17, 2026

(54) KIND OF METHOD FOR DETECTING SIALOGLYCOSYL CASEIN GLYCOMACROPEPTIDE

(71) Applicant: JIANGNAN UNIVERSITY, Wuxi (CN)

(72) Inventors: Yi Zhang, Wuxi (CN); Haodong Wei, Wuxi (CN); Yongwei Feng, Wuxi (CN); Yongxi He, Wuxi (CN); Chenhui Lu, Wuxi (CN); Lizhi Xu, Wuxi (CN); Wenlong Wang, Wuxi (CN); Xiaofang Shen, Wuxi (CN); Xiuping Yan, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 584 days.

(21) Appl. No.: 18/147,248

(22) Filed: Dec. 28, 2022

(65) Prior Publication Data

US 2023/0204545 A1    Jun. 29, 2023

Related U.S. Application Data

(63) Continuation of application No. PCT/CN2022/119544, filed on Sep. 19, 2022.

(30) Foreign Application Priority Data

Dec. 27, 2021   (CN) .......................... 202111615594.3

(51) Int. Cl.
*G01N 30/72*    (2006.01)
*B01D 15/38*    (2006.01)
(Continued)

(52) U.S. Cl.
CPC ..... *G01N 30/7233* (2013.01); *B01D 15/3804* (2013.01); *B01D 15/388* (2013.01);
(Continued)

(58) Field of Classification Search
None
See application file for complete search history.

(56) References Cited

FOREIGN PATENT DOCUMENTS

| CN | 104374848 B | 3/2017 |
|---|---|---|
| CN | 113304708 A | 8/2021 |

OTHER PUBLICATIONS

Lu, et al. Fine-tuning the specificity of boronate affinity monoliths toward glycoproteins through pH manipulation, Analyst, 2013, 138, 290-298 (Year: 2013).*

(Continued)

*Primary Examiner* — Xiaoyun R Xu
(74) *Attorney, Agent, or Firm* — HAUPTMAN HAM, LLP (57) ABSTRACT

The invention discloses a method for the detection of sialate glycosyl casein glycomacropeptide by boronate affinity column enrichment-liquid chromatography-tandem mass spectrometry using phenylboric acid modified mesoporous silica as packing material, which belongs to the field of food analysis and detection. The method includes the following steps: (1) sample preparation; (2) enrichment and purification of boronate affinity column; (3) liquid chromatography-tandem mass spectrometry detection. The invention makes use of the affinity property of phenylboric acid to the special sugar group sialic acid on the serine and threonine residues in casein glycogiant peptide, regulates the adsorption and elution of casein glycogiant peptide with sialic acid group by changing pH. Combined with the high sensitivity and accuracy of liquid chromatography tandem mass spectrometry, it can be used for qualitative and quantitative analysis of casein glycomacropeptide with sialate glycol-group in phenylketonuria special medical formulations with complex matrix.

5 Claims, 8 Drawing Sheets

(51) Int. Cl.
*G01N 30/86* (2006.01)
*G01N 33/02* (2006.01)
*G01N 30/02* (2006.01)

(52) U.S. Cl.
CPC ......... *G01N 30/8631* (2013.01); *G01N 33/02* (2013.01); *G01N 2030/027* (2013.01)

(56) References Cited

OTHER PUBLICATIONS

First Office Action issued in corresponding Chinese Application No. 202111615594.3; mailed Jul. 27, 2022; 12 pgs.
Search Report issued in corresponding Chinese Application No. 202111615594.3; dated Jul. 14, 2022; 3 pgs.
International Search Report issued in International Application No. PCT/CN2022/119544; mailed Nov. 1, 2022; 8 pgs.
Zhang, Qibin, et al; Enrichment and Analysis of Non-enzymatically Glycated Peptides: Boronate Affinity Chromatography Coupled with Electron Transfer Dissociation Mass Spectrometry; Journal of Proteome Research 2007, 6, 2323-2330.

* cited by examiner

KIND OF METHOD FOR DETECTING SIALOGLYCOSYL CASEIN GLYCOMACROPEPTIDE

RELATED APPLICATIONS

The present application is Continuation of International Application Number PCT/CN2022/119544, filed Sep. 19, 2022, and claims priority to Chinese Application Number 202111615594.3, filed Dec. 27, 2021, the disclosures of which are hereby incorporated by reference herein in their entireties.

BACKGROUND OF THE INVENTION

1. Technical Field

The present invention relates to a method for the determination of casein glycomacropeptide by boronate affinity column enrichment-liquid chromatography-tandem mass spectrometry, which belongs to the field of food analysis.

2. Background Art

Patients with phenylketonuria (PKU) cannot metabolize phenylalanine intake through diet due to the deficiency or low activity of phenylalanine hydroxylase in the body, so they need to take special medical formula food with low phenylalanine for life instead of whole protein food to meet daily nutritional requirements. Casein glycomacropeptide (CGMP) is a polypeptide without phenylalanine, the amino acid sequence 106-169 of bovine κ-casein produced by enzymolysis with rennet enzyme. In addition, CGMP contains a variety of function groups such as sialic acid, galactose, acetylgalactose amino and phosphoric acid, among which sialic acid has the functions of promoting infant brain development, antibacterial and anti-inflammatory, etc. CGMP is an ideal formula food or food additive for special medical use for PKU patients, especially for infant PKU patients. Due to the special structure, complex preparation and high cost of CGMP, it is necessary to conduct qualitative and quantitative analysis of CGMP with sialic acid in PKU special medical formulations in order to determine the true composition of peptide components and the exact content of CGMP with sialic acid in PKU special medical formulations.

Liquid chromatography-tandem mass spectrometry (LC-MS) has high sensitivity and accuracy in the analysis of polypeptides. However, when complex polypeptide samples are directly detected, the coexistence of peptides and proteins will reduce the ionization efficiency of target analyte and thus reduce the response value. CGMP is a typical glycopeptide with multiple glycosylation sites, and the phenylboric acid group on the boronate affinity column has a special affinity for the cis-o-diol structure on the glycopeptides, which can achieve the enrichment and purification of glycopeptides.

Chinese patent "A Method for glycopeptide enrichment in phenylboric acid material" (CN201310357237.0) uses boronate affinity column for glycopeptide enrichment. The boronate affinity column filler used in this method is phenylboric acid modified silica spheres with a particle size of 2-50 m; the applicable protein sources are the proteins in biological samples such as tissues, cells, serum or urine, or transferrin, fetoglobulin, horseradish peroxidase, ribonuclease B; the protease were trypsin, endopeptidase, pepsin and chymotrypsin; the rinsing solvent must have acetonitrile or methanol and other organic solvents, and pH should be neutral; The elution solvent must be an organic solvent such as acetonitrile or methanol. The above key analytical conditions are not suitable for the enrichment of CGMP in PKU special medical formula food. In addition, in the article "Enrichment and Analysis of Nonenzymatically Glycated Peptides: Boronate Affinity Chromatography Coupled with Electron-Transfer Dissociation Mass Spectrometry" (Journal of Proteome Research 2007, 6, 2323-2330), Qibin Zhang et al. reported a boronate affinity column for enrichment and separation of glycoproteins and glycopeptides. The packing material they used in boronate affinity column is agarose gel modified with phenylboric acid; automated chromatography system and gradient mobile phase were used for boronate affinity column chromatography; after boronate affinity column chromatography, C18 solid phase extraction column must be used for desalination; it is suitable for glycoprotein and trypsin digested glycopeptide in human serum; finally, the glycopeptides were analyzed by alternative-electron transfer dissociation (ETD) and collision-induced dissociation (CID) tandem mass spectrometry; its application is the diagnosis and treatment of diabetes mellitus. The above key analysis conditions are not suitable for the enrichment and analysis of CGMP in PKU special medical formula food.

The composition of biological samples is very different from that of food samples. For example, food will be added with oils, vitamins, stabilizers and other ingredients. The existence of these additives makes the pre-treatment process and analysis process of food samples completely different from that of biological samples. At present, there is no suitable affinity column purification enrichment liquid chromatography-tandem mass spectrometry method for the detection of casein giant peptides.

Therefore, it is necessary to design a method of boronate affinity column enrichment-liquid chromatography-tandem mass spectrometry for the detection of sialate glycosyl CGMP in the special medical use of phenylketonuria formula food.

SUMMARY OF THE INVENTION

In view of current technical defects and detection needs, the purpose of the present invention is to provide a sensitive and rapid method for the detection of sialate glycosyl casein glycomacropeptide (s-CGMP) in formula food for special medical purposes of phenylketonuria by boronate affinity silicon column purification liquid chromatography-tandem mass spectrometry (BAC-LC-MS), and its preparation method and application.

In order to solve the current problem of the field, the present invention provides the following technical scheme: a BAC-LC-MS method for the detection of s-CGMP of the present invention comprises the following steps: take phenylboronic acid modified mesoporous silica as BAC packing materials, make use of the affinity property of phenylboric acid to the special sugar group sialic acid on the serine and threonine residues in CGMP, regulate the adsorption and elution of CGMP with sialic acid group by changing pH, combine with the high sensitivity and accuracy of liquid chromatography tandem mass spectrometry, qualitative and quantitative analyze CGMP with sialate glycol-group in phenylketonuria special medical formulations with complex matrix. The steps are as follows: (1) sample preparation; (2) enrichment and purification by BAC; (3) LC-MS analysis.

In step (1), sample preparation: accurately weigh 5-10 g of fully homogenized sample in a beaker, add 20-30 mL deionized water, stir magnetically, heat to 90-100° C. to dissolve, cool to room temperature, adjust pH to 4.5-5.0 with hydrochloric acid, add water to 50-60 mL, centrifuge, take 20-30 mL supernatant as sample solution.

In step (2), enrichment and purification by BAC:

The preparation method of the BAC is as follows: Step i, synthesis of mesoporous silica; Step ii, Amination of mesoporous silica; Step iii, modify aminodized mesoporous silica with phenylboric acid; Step iv, prepare BAC.

Upload sample liquid to BAC, wash BAC with a pH 4.5-5.0 aqueous solution of hydrochloric acid, to remove non-sialylated casein glycomacropeptides while retaining s-CGMP, vacuumed dry the residual liquid in the column and discard all the above effluent, elute with 2 mL hydrochloric acid aqueous solution with pH of 1.0±0.2, eluent lyophilization, then use 1 mL HPLC mobile phase A to dissolve, the purified sample liquid with s-CGMP is achieved; the washing and elution solutions are free of organic solvent.

In step (3), LC-MS analysis: filter the purified liquid and test by LC-MS to obtain the ion flow chromatogram and mass spectrometry of s-CGMP. The peak area of the ion flow chromatogram is brought into the standard curve for analysis and calculation, and the structure is identified by combining with the mass spectrometry, so as to obtain the content and structure information of s-CGMP in the sample.

In step (2), step i, the synthesis of mesoporous silica: dissolve 0.25-0.3 g cetyltrimethyl ammonium bromide in 240-250 mL water, add 0.8-1.0 mL NaOH (2.0 mol/L) into the water, raise the temperature to 80° C. Then, add 5-7 mL ethyl orthosilicate into the solution, stir the mixture for 2-5 h. A white floccule will be produced. After centrifugation, discard the supernatant and retain the precipitation, wash three times with water and methanol respectively, and vacuum dry at 60° C. Then 0.4-0.5 g of the above precipitation is dispersed in 150-160 mL methanol solution containing 1.5-2.0 mL concentrated hydrochloric acid. After reflux for 5-8 h, centrifuge the precipitation and vacuum dry at 60° C. to obtain mesoporous silica.

In step (2), step ii, amination of mesoporous silica: weigh 0.3-0.4 g mesoporous silica, disperse it in 80-90 mL anhydrous toluene, add 0.5-2 mL aminopropyl triethoxylsilane, reflux for 20-24 h under nitrogen protection, centrifuge, wash the precipitate with toluene and methanol for three times respectively, and then vacuum dry to obtain aminodized mesoporous silica.

In step (2), step iii, modify aminodized mesoporous silica with phenylboric acid: weigh 0.2-0.3 g aminozed mesoporous silica and disperse it in 20-25 mL dimethyl sulfoxide. Add 0.8-1.0 g 4-carboxyphenylboric acid, 0.1-0.2 g N-hydroxysuccinimide, 0.05-0.1 g 1-ethyl-(3-dimethylaminopropyl) carbodiimide hydrochloride successively to 5-10 mL dimethyl sulfoxide, stir at room temperature for 30-60 min, and then it is added to the above ammoniated mesoporous silica dispersion solution, stirred at room temperature for 10-24 h, centrifuged. Wash the precipitate by three times with dimethyl sulfoxide, water and methanol, and vacuum dry to obtain phenylboric acid modified mesoporous silica.

In step (2), step iv, preparation of boron affinity column: pack 20 mg of phenylboric acid modified mesoporous silica into polyethylene solid phase extraction tube, add sieve plate and compact to prepare boron affinity column.

In step (3), the solvent used to redissolve the polypeptide is mobile phase A: acetonitrile aqueous solution containing 0.1% formic acid, and the volume of water and acetonitrile is 90:10.

In step (3), the chromatographic conditions are: column: Agilent AdvanceBio PeptideMapping column; column temperature: 40° C.; injection volume: 10 mL; flow rate 0.3 mL/min; mobile phase A is acetonitrile aqueous solution containing 0.1% formic acid, and the volume of water and acetonitrile is 90:10; mobile phase B was acetonitrile solution containing 0.1% formic acid, gradient elution: 0-5 min, 98% A; 5-55 min, 98%-50% A; 55-60 min, 50%-10% A; 60-75 min, 10% A.

In step (3), the MS conditions are: electrospray ion source; positive ion scanning; spray voltage: 5500 V; temperature: 450° C.; detection mode: data dependent scanning.

In step (3), the standard curve is prepared as follows: to prepare the standard solution of casein macropeptide with the concentration of 0.1-50 mg/mL; to draw the standard curve with the concentration of CGMP as the horizontal coordinate and the peak area from LC-MS as the vertical coordinate.

The application of the BAC-LC-MS method for the detection of s-CGMP in the detection of formula food for phenylketonuria special medical purposes.

The Invention has the Advantages of

The invention uses phenylboric acid modified mesoporous silica as boronate affinity column packing material. The preparation process is simple, and the highly selective adsorption and highly efficient elution of CGMP are achieved by the affinity property of phenylboric acid to special group sialic acid on the serine and threonine residues of CGMP at specific pH. The CGMP in the eluent is analyzed by liquid chromatoc-tandem mass spectrometry. The detection of CGMP in phenylketonuria formula food was realized sensitively and efficiently. To solve the problems reported in the detection of CGMP, such as weak selectivity, excessive impurities and extensive detection, this paper provides a method for the extraction and separation of CGMP with good selectivity, and a method for fine structure analysis. At the same time, it provides a new idea for the standardized detection of CGMP.

DESCRIPTION OF PREFERRED EMBODIMENTS

The detailed implementation of the invention is further described as follows. The following embodiments are used to illustrate the invention, but not to limit the scope of the invention. Technicians in this field can clearly understand the characteristics and efficacy of the invention from the contents explained in this specification, and the invention can also be implemented or applied in other specific ways. Except for special instructions, the materials and reagents etc. used in the invention can be obtained from commercial sources.

The following examples describe the preparation of the BAC and the use of the BAC-LC-MS to detect s-CGMP in formula food for phenylketonuria special medical purposes.

Example 1

A sensitive and rapid method for the detection of sialate glycosyl casein glycomacropeptide (s-CGMP) in formula food for special medical purposes of phenylketonuria by boronate affinity silicon column purification liquid chromatography-tandem mass spectrometry (BAC-LC-MS), and its preparation method and application are as follows: take phenylboronic acid modified mesoporous silica as BAC packing materials, make use of the affinity property of phenylboric acid to the special sugar group sialic acid on the serine and threonine residues in CGMP, regulate the adsorption and elution of CGMP with sialic acid group by changing pH, combine with the high sensitivity and accuracy of liquid chromatography tandem mass spectrometry, qualitative and quantitative analyze CGMP with sialate glycol-group in phenylketonuria special medical formulations with complex matrix. The steps are as follows: (1) sample preparation; (2) enrichment and purification by BAC; (3) LC-MS analysis.

1. Sample preparation: accurately weigh 5 g of fully homogenized sample in a beaker, add 30 mL deionized water, stir magnetically, heat to 100° C. to dissolve, cool to room temperature, adjust pH to 5.0 with hydrochloric acid, add water to 60 mL, centrifuge, take 20 mL supernatant as sample solution.
2. Enrichment and purification by BAC:
2.1. The synthesis of mesoporous silica: dissolve 0.28 g cetyltrimethyl ammonium bromide in 240 mL water, add 0.8 mL NaOH (2.0 mol/L) into the water, raise the temperature to 80° C. Then, add 5 mL ethyl orthosilicate into the solution, stir the mixture for 5 h. A white floccule will be produced. After centrifugation, discard the supernatant and retain the precipitation, wash three times with water and methanol respectively, and vacuum dry at 60° C. Then 0.5 g of the above precipitation is dispersed in 150 mL methanol solution containing 1.5 mL concentrated hydrochloric acid. After reflux for 5 h, centrifuge the precipitation and vacuum dry at 60° C. to obtain mesoporous silica.
2.2 Amination of mesoporous silica: weigh 0.3 g mesoporous silica, disperse it in 90 mL anhydrous toluene, add 2 mL aminopropyl triethoxylsilane, reflux for 23 h under nitrogen protection, centrifuge, wash the precipitate with toluene and methanol for three times respectively, and then vacuum dry to obtain aminodized mesoporous silica.
2.3 Modify aminodized mesoporous silica with phenylboric acid: weigh 0.3 g aminozed mesoporous silica and disperse it in 20 mL dimethyl sulfoxide. Add 1.0 g 4-carboxyphenylboric acid, 0.1 g N-hydroxysuccinimide, 0.09 g 1-ethyl-(3-dimethylaminopropyl) carbodiimide hydrochloride successively to 10 mL dimethyl sulfoxide, stir at room temperature for 50 min, and then it is added to the above ammoniated mesoporous silica dispersion solution, stirred at room temperature for 24 h, centrifuged. Wash the precipitate by three times with dimethyl sulfoxide, water and methanol, and vacuum dry to obtain phenylboric acid modified mesoporous silica.
2.4 Preparation of boronate affinity column: pack 20 mg of phenylboric acid modified mesoporous silica into polyethylene solid phase extraction tube, add sieve plate and compact to prepare boron affinity column.
2.5 Upload sample liquid to BAC, wash BAC with a pH 5.0 aqueous solution of hydrochloric acid, vacuumed dry the residual liquid in the column and discard all the above effluent, elute with 2 mL hydrochloric acid aqueous solution with pH of about 1.0, eluent lyophilization, then use 1 mL HPLC mobile phase A to dissolve, the purified sample liquid with s-CGMP is achieved.
3. LC-MS analysis: a standard solution of CGMP with a concentration of 0.1-50 (μg/mL) was prepared, filter the CGMP standard solution and sample liquid with 0.22 μm filter and test by LC-MS to obtain the ion flow chromatogram and mass spectrometry of s-CGMP. The peak area of the ion flow chromatogram is brought into the standard curve for analysis and calculation, and the structure is identified by combining with the mass spectrometry to obtain the content and structure information of s-CGMP in the sample. The solvent used to redissolve the polypeptide is mobile phase A: acetonitrile aqueous solution containing 0.1% formic acid, and the volume of water and acetonitrile is 90:10. The chromatographic conditions are: column: Agilent AdvanceBio PeptideMapping column; column temperature: 40° C.; injection volume: 10 mL; flow rate 0.3 mL/min; mobile phase A is acetonitrile aqueous solution containing 0.1% formic acid, and the volume of water and acetonitrile is 90:10; mobile phase B was acetonitrile solution containing 0.1% formic acid, gradient elution: 0-5 min, 98% A; 5-55 min, 98%-50% A; 55-60 min, 50%-10% A; 60-75 min, 10% A. The MS conditions are: electrospray ion source; positive ion scanning; spray voltage: 5500 V; temperature: 450° C.; detection mode: data dependent scanning. The standard curve is prepared as follows: to prepare the standard solution of casein macropeptide with the concentration of 0.1-50 μg/mL; to draw the standard curve with the concentration of CGMP as the horizontal coordinate and the peak area from LC-MS as the vertical coordinate.

The application of the BAC-LC-MS method for the detection of s-CGMP in the detection of formula food for phenylketonuria special medical purposes.

Figure 1:
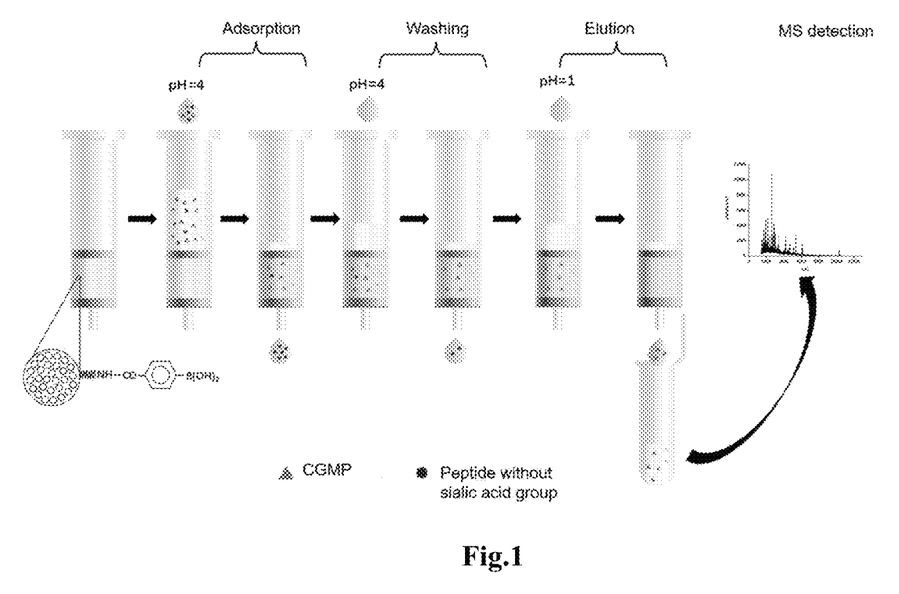
FIG. 1 is a schematic diagram of the operating flow of the invention.

FIG. 1 is a schematic diagram of the operating flow of the invention.

Figure 4A:
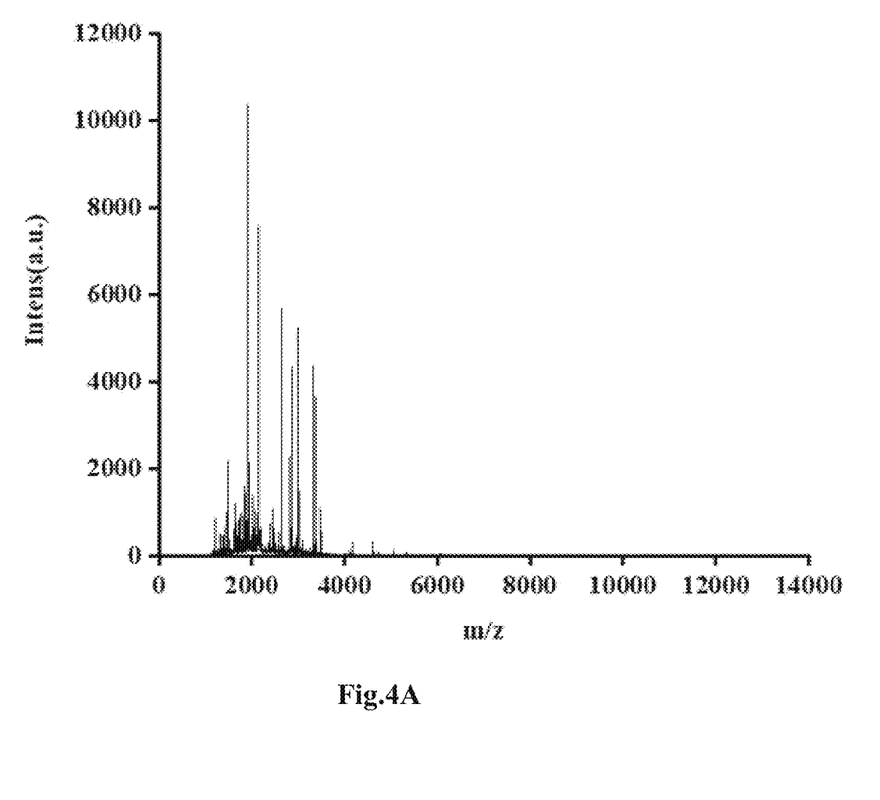
FIGS. 4A and 4B show MALDI-TOF mass spectrometry before and after enrichment in Embodiment 2.
Figure 4B:
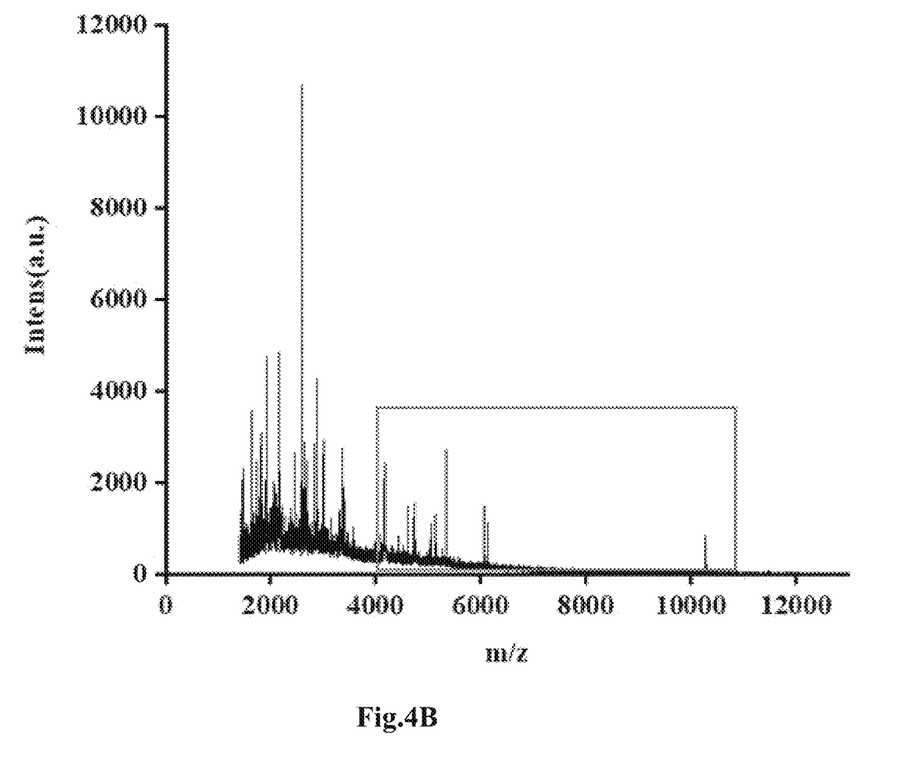

FIGS. 4A and 4B show the MALDI-TOF mass spectra before and after enrichment in Embodiment 2. Casein macropeptides were in the range of 5000-7000 Da, and the content of peptides with mass/charge ratio above 4000 Da increased significantly before and after enrichment. Therefore, phenylboric acid-modified mesopore silica had enrichment effect on s-CGMP.

Figure 2A:
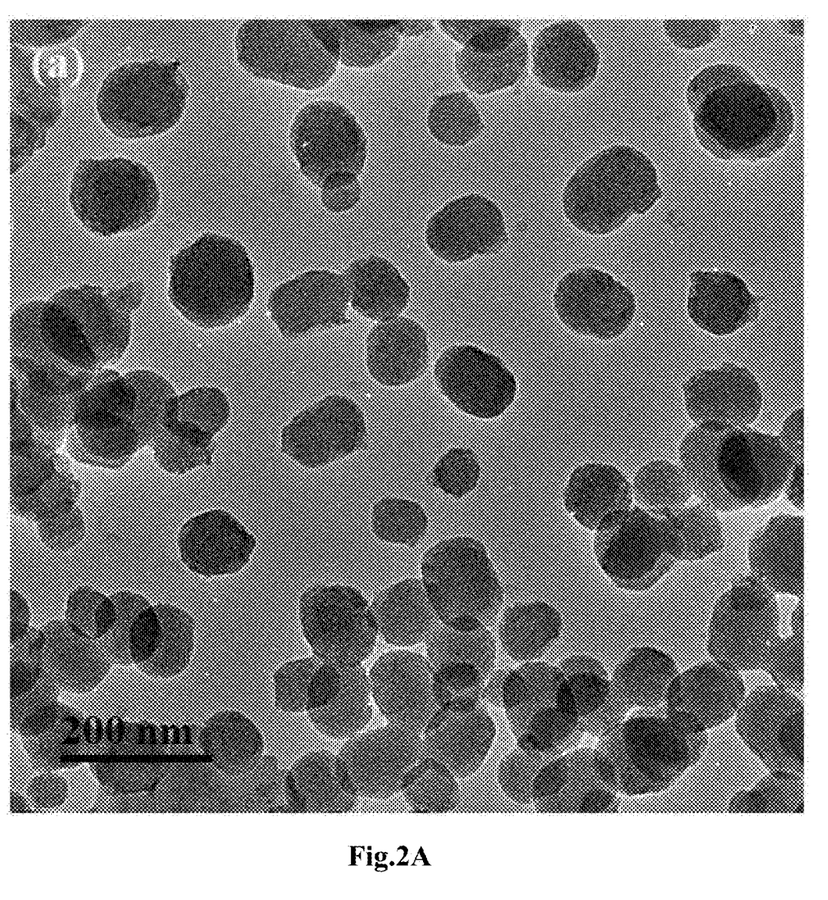
FIGS. 2A and 2B are a transmission electron microscope image of phenylboric acid-modified mesoporous silica synthesized in Embodiment 1.
Figure 2B:
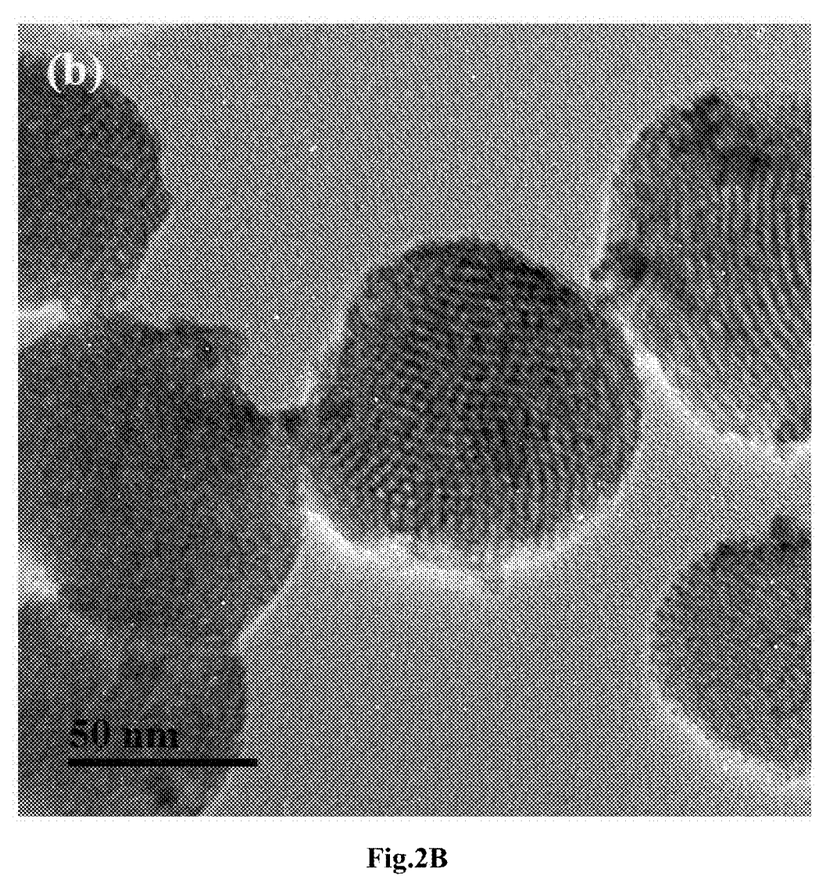
Figure 3A:
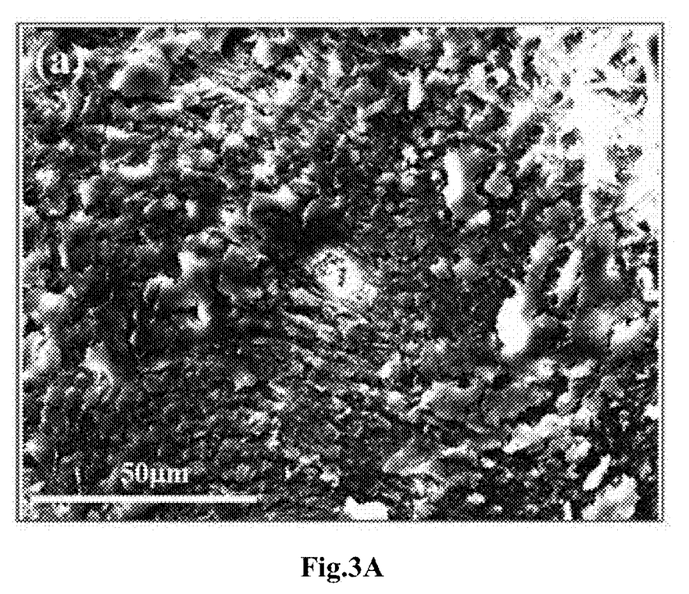
FIGS. 3A-3F show the elemental analysis diagram of phenylboric acid-modified mesoporous silica synthesized in Embodiment 1.
Figure 3B:
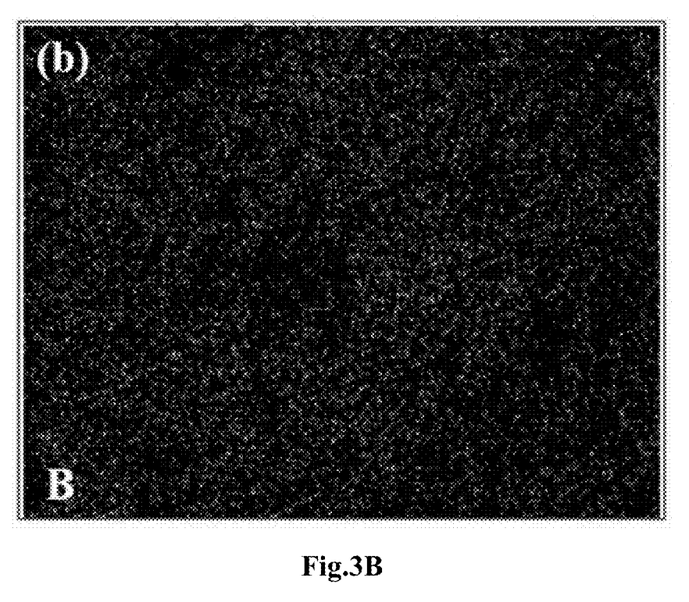
Figure 3C:
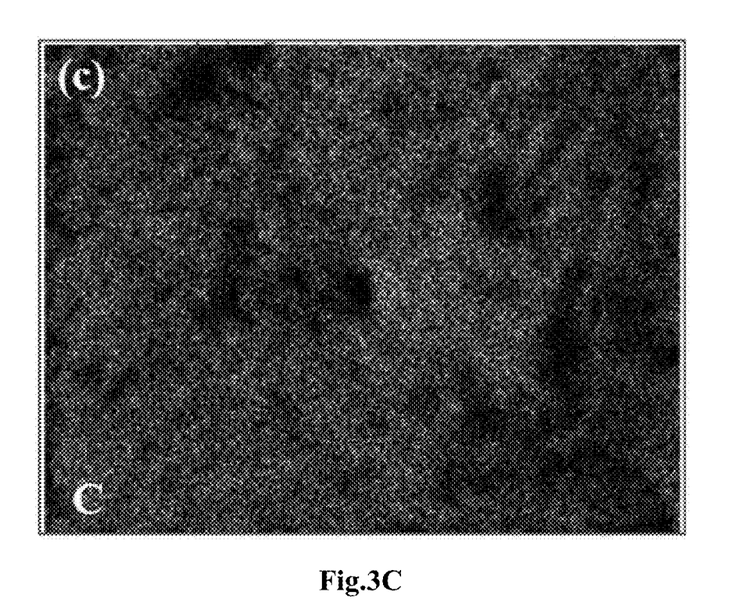
Figure 3D:
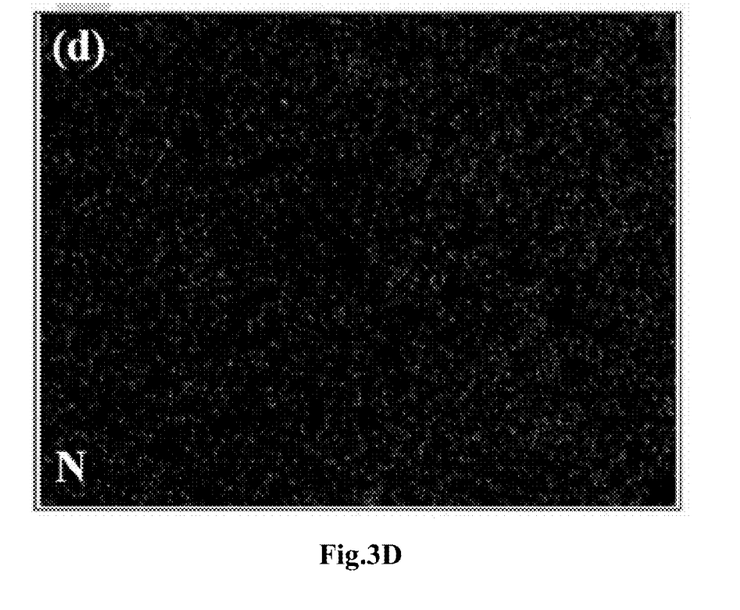
Figure 3E:
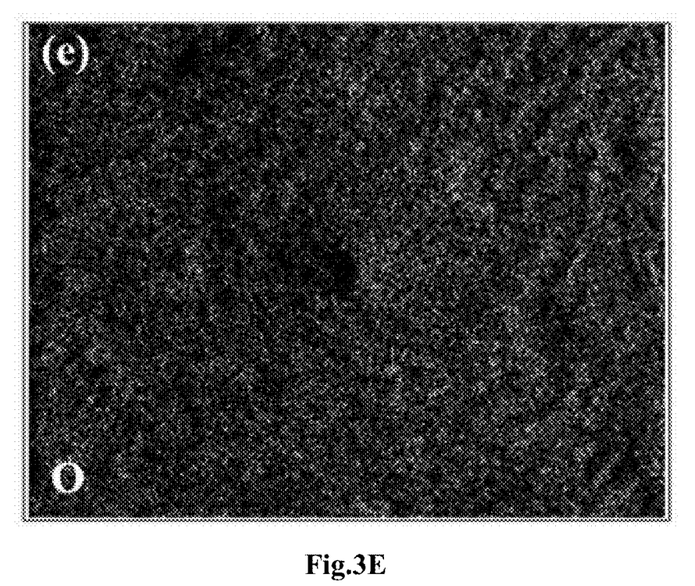
Figure 3F:
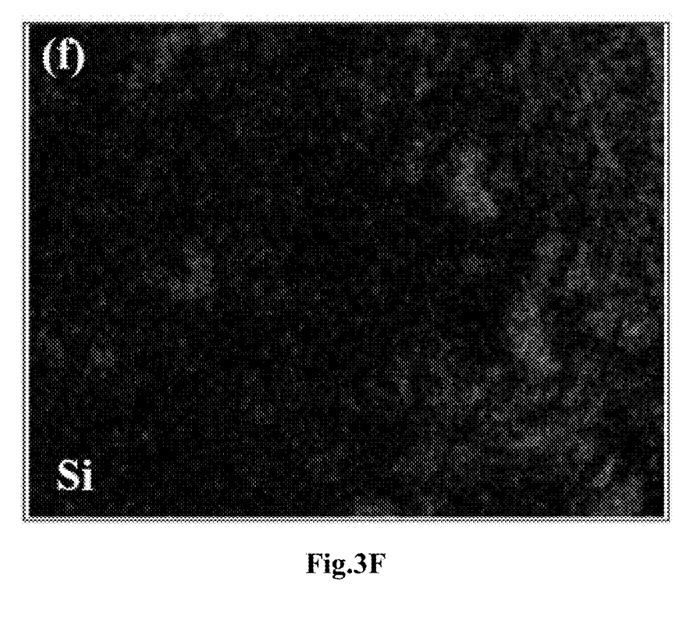

FIGS. 2A and 2B are a transmission electron microscope image of phenylboric acid-modified mesoporous silica synthesized in Embodiment 1. It can be seen from FIG. 2A that the synthesized mesoporous silica is a spherical material with a diameter of about 100 nm and has good dispersion. It can be seen from FIG. 2B that there are about 2-3 nm mesoporous pores on the surface of silica microspheres.

FIGS. 3A-3F are the scanning electron microscope and element spectrum diagram of phenylboric acid modified mesoporous silica synthesized in Embodiment 1. The distribution of elements B, C, N, O and Si is consistent with the distribution of materials, and there are more elements where there are more silica materials, and the content of element B is finally calculated as 9.23%.

Example 2

The method of BAC-LC-MS for the detection of s-CGMP is as follows:

1. Sample preparation: accurately weigh 10 g of fully homogenized sample in a beaker, add 25 mL deionized water, stir magnetically, heat to 90° C. to dissolve, cool to room temperature, adjust pH to 4.8 with hydrochloric acid, add water to 50 mL, centrifuge, take 20 mL supernatant as sample solution.
2. Enrichment and purification by BAC:
2.1. The synthesis of mesoporous silica: dissolve 0.25 g cetyltrimethyl ammonium bromide in 250 mL water, add 1.0 mL NaOH (2.0 mol/L) into the water, raise the temperature to 80° C. Then, add 7 mL ethyl orthosilicate into the solution, stir the mixture for 2 h. A white floccule will be produced. After centrifugation, discard the supernatant and retain the precipitation, wash three times with water and methanol respectively, and vacuum dry at 60° C. Then 0.4 g of the above precipitation is dispersed in 160 mL methanol solution containing 2.0 mL concentrated hydrochloric acid. After reflux for 8 h, centrifuge the precipitation and vacuum dry at 60° C. to obtain mesoporous silica.
2.2 Amination of mesoporous silica: weigh 0.35 g mesoporous silica, disperse it in 80 mL anhydrous toluene, add 1.5 mL aminopropyl triethoxylsilane, reflux for 20 h under nitrogen protection, centrifuge, wash the precipitate with toluene and methanol for three times respectively, and then vacuum dry to obtain aminodized mesoporous silica.
2.3 Modify aminodized mesoporous silica with phenylboric acid: weigh 0.25 g aminozed mesoporous silica and disperse it in 25 mL dimethyl sulfoxide. Add 0.8 g 4-carboxyphenylboric acid, 0.2 g N-hydroxysuccinimide, 0.05 g 1-ethyl-(3-dimethylaminopropyl) carbodiimide hydrochloride successively to 5 mL dimethyl sulfoxide, stir at room temperature for 30 min, and then it is added to the above ammoniated mesoporous silica dispersion solution, stirred at room temperature for 20 h, centrifuged. Wash the precipitate by three times with dimethyl sulfoxide, water and methanol, and vacuum dry to obtain phenylboric acid modified mesoporous silica.
2.4 Preparation of boron affinity column: same as Example 1.
2.5 Upload sample liquid to BAC, wash BAC with a pH 4.5 aqueous solution of hydrochloric acid, vacuumed dry the residual liquid in the column and discard all the above effluent, elute with 5 mL hydrochloric acid aqueous solution with pH of about 1.0, eluent lyophilization, then use 1 mL HPLC mobile phase A to dissolve, the purified sample liquid with s-CGMP is achieved.
3. LC-MS analysis: Same as Example 1.

Example 3

The method of BAC-LC-MS for the detection of s-CGMP is as follows:
1. Sample preparation: accurately weigh 6 g of fully homogenized sample in a beaker, add 20 mL deionized water, stir magnetically, heat to 95° C. to dissolve, cool to room temperature, adjust pH to 4.8 with hydrochloric acid, add water to 56 mL, centrifuge, take 20 mL supernatant as sample solution.
2. Enrichment and purification by BAC:
2.1. The synthesis of mesoporous silica: dissolve 0.3 g cetyltrimethyl ammonium bromide in 245 mL water, add 0.9 mL NaOH (2.0 mol/L) into the water, raise the temperature to 80° C. Then, add 6 mL ethyl orthosilicate into the solution, stir the mixture for 4 h. A white floccule will be produced. After centrifugation, discard the supernatant and retain the precipitation, wash three times with water and methanol respectively, and vacuum dry at 60° C. Then 0.45 g of the above precipitation is dispersed in 155 mL methanol solution containing 1.55 mL concentrated hydrochloric acid. After reflux for 7 h, centrifuge the precipitation and vacuum dry at 60° C. to obtain mesoporous silica.
2.2 Amination of mesoporous silica: weigh 0.4 g mesoporous silica, disperse it in 85 mL anhydrous toluene, add 0.5 mL aminopropyl triethoxylsilane, reflux for 24 h under nitrogen protection, centrifuge, wash the precipitate with toluene and methanol for three times respectively, and then vacuum dry to obtain aminodized mesoporous silica.
2.3 Modify aminodized mesoporous silica with phenylboric acid: weigh 0.2 g aminozed mesoporous silica and disperse it in 24 mL dimethyl sulfoxide. Add 0.9 g 4-carboxyphenylboric acid, 0.15 g N-hydroxysuccinimide, 0.08 g 1-ethyl-(3-dimethylaminopropyl) carbodiimide hydrochloride successively to 8 mL dimethyl sulfoxide, stir at room temperature for 60 min, and then it is added to the above ammoniated mesoporous silica dispersion solution, stirred at room temperature for 10 h, centrifuged. Wash the precipitate by three times with dimethyl sulfoxide, water and methanol, and vacuum dry to obtain phenylboric acid modified mesoporous silica.
2.4 Preparation of boron affinity column: pack 40 mg of phenylboric acid modified mesoporous silica into polyethylene solid phase extraction tube, add sieve plate and compact to prepare boron affinity column.
2.5 Upload sample liquid to BAC, wash BAC with a pH 4.8 aqueous solution of hydrochloric acid, vacuumed dry the residual liquid in the column and discard all the above effluent, elute with 3 mL hydrochloric acid aqueous solution with pH of about 1.0, eluent lyophilization, then use 1 mL HPLC mobile phase A to dissolve, the purified sample liquid with s-CGMP is achieved.
3. LC-MS analysis: Same as Example 1.

The foregoing is only the preferred embodiments of the present invention. For the common technical personnel in this technical field, without departing from the principle of the present invention, several improvements and modifications can be made, and these improvements and modifications are also should be regarded as the protection scope of the present invention.

What is claimed is:

1. A method of boronate affinity column-enrichment-liquid chromatography-tandem mass spectrometry, abbreviated as BAC-LC-MS, for the detection of sialate glycosyl casein glycogiant peptides, abbreviated as s-CGMP, includes the following steps:

using phenylboric acid modified mesoporous silica as the boronate affinity column packing materials; the affinity property of phenylboric acid to the special sialate glycosyl on the residues of serine and threonine in CGMP is used; to regulate the adsorption and eluation of s-CGMP by changing pH, and then analyze by LC-MS to realize the detection of s-CGMP in foods for phenylketonuria special medical purposes, abbreviated as FPSMP;

the steps are as follows:

(1) sample preparation: 5 to 10 g of fully homogenized sample is accurately weighed in a beater, dissolved in 20-30 mL deionized water, magnetically stirred, heated to 90° C., cooled to room temperature; to adjust pH to 4.5-5.0 with hydrochloric acid, add water to 50 mL, centrifuge, and 20 mL of supernatant is taken as sample solution;

(2) preparation and application of BAC;

Step i, synthesis of mesoporous silica: 0.25-0.3 g cetyltrimethylammonium ammonium bromide is dissolved in 240-250 mL water, 2.0 mol/L 0.8-1.0 mL NaOH is added into the water, the temperature is raised to 80° C., and 5-7 mL ethyl orthosilicate is added into the solution; the mixture is stirred for 2-5 h and white flocculent is produced; after centrifugation, the supernatant is discarded and the precipitation is retained, washed three times with water and methanol respectively, and vacuum dried at 60° C.; then 0.4-0.5 g of the dry precipitation is dispersed in 150-160 mL methanol solution containing 1.5-2.0 mL concentrated hydrochloric acid; ater reflux for 5-8 h, the precipitation is centrifuged and vacuum dried at 60° C. to obtain mesoporous silica;

Step ii, amination of mesoporous silica: weigh 0.3-0.4 g mesoporous silica prepared in step 1, and disperse it into 80-90 mL anhydrous toluene, add 0.5-2 mL aminopropyl triethoxylsilane, heat and reflux under nitrogen protection for 20-24 h, centrifuge, precipitate by washing with toluene and methanol for three times respectively, and then vacuum drying to obtain aminodized mesoporous silica;

Step iii, modify aminodized mesoporous silica with phenylboric acid: weigh 0.2-0.3 g aminozed mesoporous silica and disperse it in 20-25 mL dimethyl sulfoxide; 0.8-1.0 g 4-carboxyphenylboric acid, 0.1-0.2 g n-hydroxysuccinimide, 0.05-0.1 g 1-ethyl-(3-dimethylaminopropyl) carbodiimide hydrochloride were successively added to 5-10 mL dimethyl sulfoxide for reaction; after stirring at room temperature for 30-60 min, it is added to the above ammoniated mesoporous silica dispersion solution, stirred at room temperature for 10-24 h, centrifuged, and precipitated by washing three times with dimethyl sulfoxide, water and methanol respectively, and vacuum drying to obtain phenylboric acid modified mesoporous silica;

Step iv, preparation and application of BAC: a BAC is prepared by loading 20 mg of phenylboric acid modified mesoporous silica into a polyethylene solid phase extraction tube and compacting with a sieve plate; after sample loading, the sample solution in the BAC is washed with hydrochloric acid aqueous solution with pH of 4.5-5.0 to remove non-sialylated casein glycomacropeptides while retaining s-CGMP, the residual liquid in the column is drained, and all the above effluents are discarded; elute with 2 mL hydrochloric acid aqueous solution with pH of 1.0±0.2, the washing and elution solutions being free of organic solvent lyophilized, dissolve with 1 mL liquid chromatography mobile phase, the purification solution was obtained; the above washing and elution pH values are only applicable to the washing and elution of s-CGMP, but not to other glycosylated casein giant peptides;

(3) Liquid chromatography-tandem mass spectrometry (LC-MS) analysis: the purified liquid as prepared in (2) is filtered through water phase filtration membrane and tested by LC-MS to obtain the ion flow chromatography and mass spectra of s-CGMP; the peak area of the ion flow chromatography is brought into the standard curve for analysis and calculation, and the structure is identified by combining with the mass spectrometry, so as to obtain the content and structure information of s-CGMP in the sample.

2. The method according to claim 1, wherein in the step (3), the solvent used to redissolve the polypeptide is mobile phase A: acetonitrile aqueous solution containing 0.1% formic acid, and the volume of water and acetonitrile is 90:10; and wherein the boronate affinity packing is non-molecularly-imprinted.

3. The method according to claim 1, wherein in the step (3), the chromatographic conditions are: column: Agilent AdvanceBio PeptideMapping column; column temperature: 40° C.; injection volume: 10 mL; flow rate 0.3 mL/min; mobile phase A is acetonitrile aqueous solution containing 0.1% formic acid, and the volume of water and acetonitrile is 90:10; mobile phase B was acetonitrile solution containing 0.1% formic acid, gradient elution: 0-5 min, 98% A; 5-55 min, 98%-50% A; 55-60 min, 50%-10% A; 60-75 min, 10% A.

4. The method according to claim 1, wherein in the step (3), the MS conditions are: electrospray ion source; positive ion scanning; spray voltage: 5500 V; temperature: 450° C.; detection mode: data dependent scanning.

5. The method according to claim 1, wherein in the step (3), the standard curve is prepared as follows: to prepare the standard solution of casein macropeptide with the concentration of 0.1-50 μg/mL; to draw the standard curve with the concentration of CGMP as the horizontal coordinate and the peak area from LC-MS as the vertical coordinate.

* * * * *